United States Patent
Kloster

(10) Patent No.: US 6,719,207 B2
(45) Date of Patent: Apr. 13, 2004

(54) MICROPROCESSOR CONTROLLED TWO STAGE FURNACE

(75) Inventor: John M. Kloster, Rockton, IL (US)

(73) Assignee: Dura Global Technologies, Inc., Rochester Hills, MI (US)

( * ) Notice: Subject to any disclaimer, the term of this patent is extended or adjusted under 35 U.S.C. 154(b) by 0 days.

(21) Appl. No.: 10/260,769

(22) Filed: Sep. 30, 2002

(65) Prior Publication Data

US 2003/0029924 A1 Feb. 13, 2003

Related U.S. Application Data

(62) Division of application No. 09/676,735, filed on Sep. 28, 2000, now Pat. No. 6,464,000.

(51) Int. Cl.[7] .......................... F25D 17/04; G05D 23/00
(52) U.S. Cl. ........................................... 236/11; 62/186
(58) Field of Search ............................... 236/1 EB, 10, 236/11

(56) References Cited

U.S. PATENT DOCUMENTS

| | | | |
|---|---|---|---|
| 4,638,942 A | 1/1987 | Ballard et al. | 236/10 |
| 4,887,767 A | 12/1989 | Thompson et al. | 236/1 EB |
| 5,326,025 A | 7/1994 | Dempsey et al. | 236/11 |
| 5,340,028 A | 8/1994 | Thompson | 236/10 |
| 5,379,752 A | 1/1995 | Virgil, Jr. et al. | 126/116 A |
| 5,572,104 A | * 11/1996 | Nold et al. | 318/672 |
| 5,765,544 A | 6/1998 | Vigansky, Jr. | 126/113 |
| 5,806,760 A | 9/1998 | Maiello | 236/11 |
| 5,847,526 A | * 12/1998 | Lasko et al. | 318/471 |
| 5,992,410 A | 11/1999 | Raleigh et al. | 126/110 AA |
| 6,021,775 A | 2/2000 | Dempsey et al. | 126/110 AA |
| 6,155,341 A | * 12/2000 | Thompson et al. | 165/244 |
| 6,244,515 B1 | * 6/2001 | Rowlette et al. | 236/1 E |

OTHER PUBLICATIONS

Eight Edition Marks Handbook for Mechanical Engineers, May 22, 1980.*

* cited by examiner

Primary Examiner—William Wayner
(74) Attorney, Agent, or Firm—Casimer R. Kiczek

(57) ABSTRACT

An air comfort control device is disclosed, which has a furnace with a furnace fan, an air conditioner with an air conditioner fan positioned remote from the furnace fan, and a temperature controller responsive to temperature changes in air in a partially enclosed environment, wherein the temperature controller sends a fan output signal to both the furnace fan and the air conditioner fan to run together to circulate air through the partially enclosed environment. The thermostat controller may also provide for multiple operation settings, including both automatic and manual options. The air comfort control device may also have a motor controller capable of sending more than one voltage to a blower motor to set a furnace fan at more than one speed. The motor controller can be produced separate from an ignition controller where the ignition controller sets the gas valve to a high position or a low position.

20 Claims, 8 Drawing Sheets

| SYSTEM SLIDE SWITCH | | | SCROLL ORDER OF DISPLAYED MODES | | | | OPERATION |
|---|---|---|---|---|---|---|---|
| COOL | OFF | HEAT | FAN | | | | FURNACE OPERATION |
| | | ● | AU | | | | FURNACE AUTOMATICALLY SWITCHES BETWEEN HIGH AND LOW BTU VALVE AND HIGH AND LOW SPEED FAN WHEN CYCLING TO SATISFY SET POINT. |
| | | ● | | HI | | | FURNACE HIGH BTU VALVE AND HIGH SPEED FURNACE FAN CYCLE TO SATISFY SET POINT. |
| | | ● | | | LO | | FURNACE LOW BTU VALVE AND LOW SPEED FURNACE FAN CYCLE TO SATISFY SET POINT. |
| | | ● | | | | HF | FURNACE FAN RUNS AT HIGH SPEED TO CIRCULATE AIR. AIR CONDITIONER FAN DOES NOT RUN. |
| | | ● | | | | LF | FURNACE FAN RUNS AT LOW SPEED TO CIRCULATE AIR. AIR CONDITIONER FAN DOES NOT RUN. |
| COOL | OFF | HEAT | FAN | SCROLL ORDER OF DISPLAYED MODES | | | AIR CONDITIONER OPERATION |
| ● | | | AU | | | | AIR CONDITIONER AUTOMATICALLY SWITCHES BETWEEN HIGH AND LOW COMPRESSOR AND HIGH AND LOW SPEED FAN WHEN CYCLING TO SATISFY SET POINT. |
| ● | | | | HI | | | AIR CONDITIONER HIGH COMPRESSOR AND HIGH SPEED FAN CYCLE TO SATISFY SET POINT. |
| ● | | | | | LO | | AIR CONDITIONER LOW COMPRESSOR AND LOW SPEED FAN CYCLE TO SATISFY SET POINT. |
| ● | | | | | | HF | AIR CONDITIONER FAN RUNS AT HIGH SPEED TO CIRCULATE AIR. FURNACE FAN DOES NOT RUN. |
| ● | | | | | | LF | AIR CONDITIONER FAN RUNS AT LOW SPEED TO CIRCULATE AIR. FURNACE FAN DOES NOT RUN. |
| COOL | OFF | HEAT | FAN | SCROLL ORDER OF DISPLAYED MODES | | | FAN OPERATION |
| | | | ● | | HI | | AIR CONDITIONER FAN AND FURNACE FAN RUN AT HIGH SPEED TO CIRCULATE AIR. |
| | | | ● | | | LO | AIR CONDITIONER FAN AND FURNACE FAN RUN AT LOW SPEED TO CIRCULATE AIR. |
| COOL | OFF | HEAT | FAN | OFF | | | OFF |
| | ● | | | | | | NO OPERATION OCCURS |

MICROPROCESSOR CONTROLLED TWO STAGE FURNACE

CROSS REFERENCE TO A RELATED APPLICATION

This patent application is a division of corresponding U.S. patent application Ser. No. 09/676,735, filed on Sep. 28, 2000, now U.S. Pat. No. 6,464,000.

FIELD OF THE INVENTION

The present invention generally relates to furnaces, and more particularly to improved two-stage furnaces with two stage thermostats.

BACKGROUND OF THE INVENTION

Air comfort control devices are used to set the temperature of an at least partially enclosed environment such as a room, a house, a motor home, etc. Regulation of the operation of air comfort control devices such as furnaces and air conditioners can be accomplished through various electronic controllers. Such controllers can set a furnace such as a gas burning furnace to a high BTU setting or a low BTU setting. The high BTU setting is used to rapidly heat the partially enclosed environment when the temperature is substantially below a desired temperature. When the temperature approaches the desired temperature (generally within a few degrees Fahrenheit) the furnace switches to the low BTU setting to provide a more gradual rise and reduce overshoot of the desired temperature. Such two stage furnaces may be controlled by two stage thermostat controllers and also allow manual control of the furnace to either BTU setting.

When heating is not necessary it may still be desirable to circulate air throughout the partially enclosed environment through the use of a fan. Some air comfort control devices have separate fans for cooling and for heating. This is especially true of air comfort control devices used in recreational vehicles and motor homes where a separate furnace and air conditioner are typically used. It would be desirable to have a temperature controller, which controlled both the furnace fan and the air conditioner fan so that they could operate simultaneously.

Gas furnaces typically have a gas valve connected to a gas source, an igniter and a blower motor. The blower motor rotates the furnace fan. In known furnaces, particularly residential furnaces which rely on common 110 V AC power sources, an ignition controller which also controls the motor sends a constant voltage to different portions of windings of a multi-speed blower motor to affect different furnace fan speeds. In some applications, especially recreational vehicles, a 100 V AC power supply may not be readily available. It would be desirable to have a controller, which can account for irregular power supplies to provide current to a blower motor and generate multiple furnace fan speeds.

Known furnace controllers typically have one controller which controls both the blower motor and the gas valve (in response to input signals from the thermostat) and also performs all of the mandated safety checks, including, for example, checking sail switches and limit switches and other diagnostics. It would be desirable to be able to replace components directed to safety and diagnostic control independent of components directed to control of the blower motor and the gas valve.

In view of the foregoing, it is an object of the present invention to provide an air comfort control device capable of controlling an air conditioning fan and a furnace fan. It is an additional object of the present invention to provide an air comfort control device where a motor controller, which can supply current to a single speed blower motor and generate multiple furnace fan speeds. It is an additional object of the present invention to provide a furnace with a separate motor controller and ignition controller. It is still another object of the present invention to incorporate microprocessor controls into the air comfort control device to provide greater control of furnace operation and increase customer setting options. It is still another object of preferred embodiments of the present invention to provide an air comfort control device that is of low cost, compact size, easy to manufacture and which is highly reliable in operation.

SUMMARY OF THE INVENTION

In accordance with a first aspect, there is provided an air comfort control device comprising a furnace having a furnace fan, an air conditioner having an air conditioner fan positioned remote from the furnace fan, and a temperature controller responsive to temperature changes in air in a partially enclosed environment and adapted to receive a fan input signal. The temperature controller sends a fan output signal to both the furnace fan and the air conditioner fan to run together to circulate air through the partially enclosed environment. Preferably wherein the temperature controller is adapted to receive several different input signals, including a temperature input signal, a desired temperature input signal, and a mode input signal. Based on these input signals the thermostat controller sends output signals to the furnace, advantageously permitting an operator to choose one of many different settings for enhanced comfort.

In accordance with another aspect, a comfort control device has a blower motor that rotates the furnace fan at either a high speed or a low speed, and a motor controller which in response to a fan output signal from the temperature controller sends a first voltage to actuate the blower motor so that the furnace fan rotates at the high speed and a second voltage different from the first voltage to actuate the blower motor so that the furnace fan rotates at the low speed.

In accordance with another aspect, a comfort control device further comprises a gas valve having a closed position and an open position, and when the gas valve is in the open position it is further in one of a high position and a low position. An ignition controller sends a signal to the move the gas valve between the open and closed positions. The motor controller is separate from the ignition controller. In response to a signal from the temperature controller the motor controller sends a motor control signal to actuate the blower motor so that the furnace fan rotates at one of the high speed and the low speed and sends a secondary valve signal to move the gas valve to one of a high position and a low position.

From the foregoing disclosure and the following more detailed description of various preferred embodiments it will be apparent to those skilled in the art that the present invention provides a significant advance in the technology and art of furnaces, particularly two-stage furnaces. Particularly significant in this regard is the potential the invention affords for providing a furnace that is reliable, durable and has a long life. Additional features and advantages of various preferred embodiments will be better understood in view of the detailed description provided below.

BRIEF DESCRIPTION OF THE DRAWINGS

FIG. 4 is a chart showing the 13 modes of operation of the furnace in accordance with a preferred embodiment.

Figure 1:
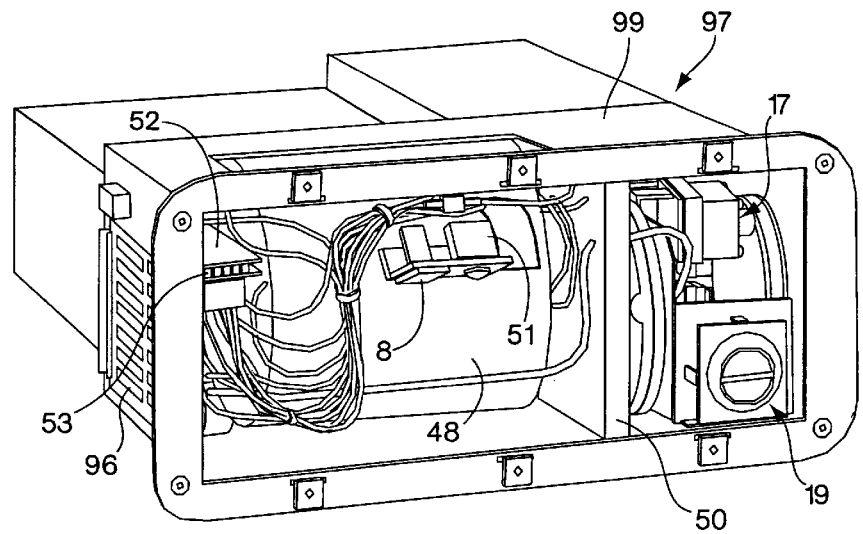
FIG. 1 is a perspective view of a furnace in accordance with a preferred embodiment.

It should be understood that the appended drawings are not necessarily to scale, presenting a somewhat simplified representation of various preferred features illustrative of the basic principles of the invention. The specific design features of the air comfort control device disclosed here, including, for example, the blower motor and the gas valve will be determined in part by the particular intended application and use environment. Certain features of the illustrated embodiments have been enlarged or distorted relative to others to facilitate visualization and clear understanding. In particular, thin features may be thickened for clarity of illustration. All references to direction and position, unless otherwise indicated, refer to the orientation of the furnace illustrated in the drawings. In general, up, upward, and top and down, downward and bottom refers to corresponding directions in the plane of the paper in FIG. 1. The same reference numerals are used in the drawings to identify identical features of different preferred embodiments.

DETAILED DESCRIPTION OF CERTAIN PREFERRED EMBODIMENTS

It will be apparent to those skilled in the art, that is, to those who have knowledge or experience in this area of technology that many design variations are possible for the furnace disclosed herein. The following detailed discussion of various alternative and preferred features and embodiments will illustrate the general principles of the invention with reference to a furnace suitable for use in a motor home. Other embodiments suitable for other applications will be readily apparent to those skilled in the art given the benefit of this disclosure.

Referring now to the drawings, FIG. 1 shows a preferred embodiment of a furnace 97 with an access door removed from a housing 99 revealing blower motor housing 48 separated from a gas valve 17 by a motor/combustion wall 50. Air for combustion of the gas from the gas valve 17 enters through a draft cap assembly 19 which can include one or more filters, and the wall 50 separates this source of air from the air to be heated. The air to be heated may enter through vents 96. A motor controller 53 is affixed to a bracket 52. The motor controller 53 is used to control the gas valve position and blower motor and is discussed in greater detail below. The furnace 97 typically has an on/off switch 8 and a circuit breaker 51, as well as other safety features.

Figure 2:
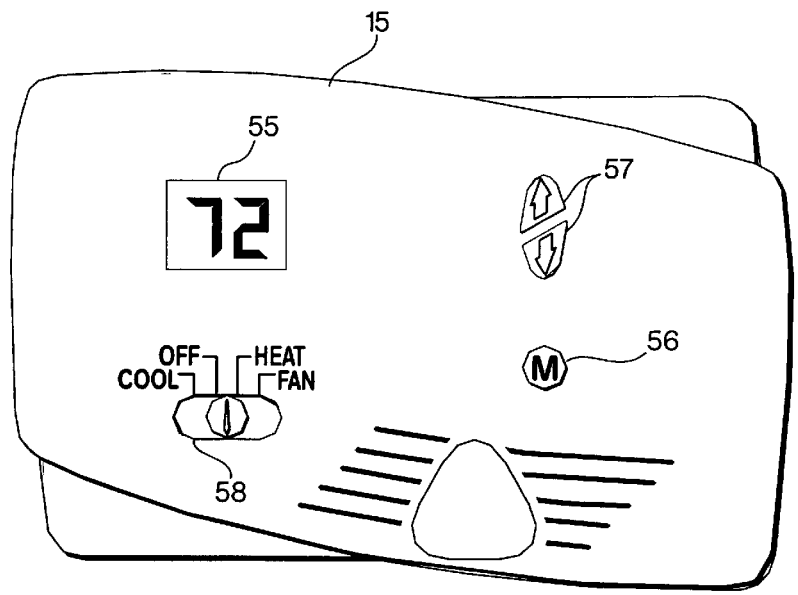
FIG. 2 is a side view of a thermostat for controlling the furnace of FIG. 1.

FIG. 2 shows a thermostat 15 with an LCD temperature display 55, a switch 58 which can be set to one of 4 positions: Off, Cool, Heat and Fan, a mode button 56 and scroll buttons 57. This combination of buttons and switches allows an operator to select one of a variety of settings to set the air temperature in a partially enclosed environment such as house or a recreational vehicle (or even a single room of such constructions) to a desired temperature. The desired temperature, as that term is used herein, is understood to be a temperature range, as it is undesirable to have the furnace continually cycling on and off to account for fractions of a degree in temperature variation. In the preferred embodiment shown in the drawings, the temperature range is set to plus or minus 2 degrees Fahrenheit. More or less precise desired temperature ranges will be readily apparent to those skilled in the art given the benefit of this disclosure.

Figure 3:
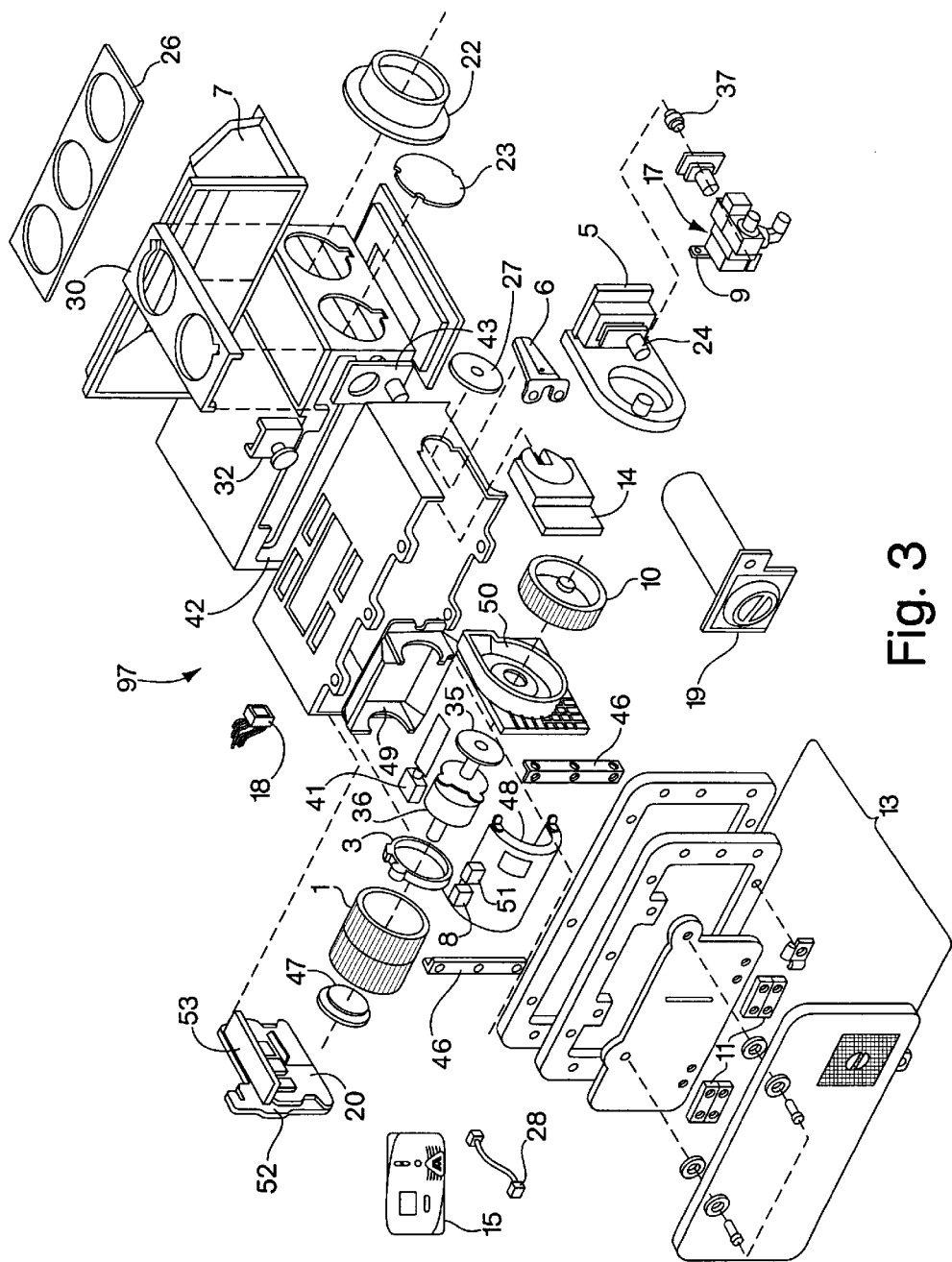
FIG. 3 is an exploded perspective view of the furnace of FIG. 1.

Preferably the furnace 97 is a two-stage furnace having a high BTU setting which rapidly heats the air and a low BTU setting which does not heat the air as rapidly. A Low BTU setting is desirable as the air temperature approaches the desired temperature to reduce overshoot. FIG. 3 shows an exploded perspective view of the furnace with a two stage valve 17. The valve 17 is attached via a valve mounting bracket to the furnace and releases ignitable gas to a burner box 5 through orifice 37. Preferably the valve 17 is a two stage valve having a first or main on/off valve, a second redundant on/off valve, and a third valve with a high position and which can also be set to a low position. See FIG. 6 for the several valves that form the two-stage valve. The valve positions may be actuated by solenoids and controlled by the motor controller 52 and the ignition controller 20 in a manner described in greater detail below. The high position corresponds to a high BTU setting for the furnace, and the low position corresponds to a low BTU setting for the furnace. An electrode 24 receives electricity from a high tension lead 28 to create a spark. An air combustion wheel 10 draws in air from draft cap assembly 19 (preferably through one or more filters) to the electrode 24 where the air meets the gas and is ignited by the spark. This heated exhaust air is then routed to a heat transfer element assembly 42. The heated exhaust air is kept separate from the air to be circulated by an exhaust wall gasket 43, gas inlet plug 27 (which a gas line would run through) and motor combustion wall 50. Combustion wheel 10 may be accessed for service through slide plate 14.

On the other side of the motor/combustion wall 50, air to be heated is blown in by a furnace fan such as blower wheel 1. This air is then routed to the heat transfer element assembly 42 where the heat of the exhaust air is transferred. The heated air is then routed through an extension box 7 and plenum plate assembly 4, 26, and 30 and out to air ducts which then route the warm air to the partially enclosed environment. Duct adapters 22 may be provided for connecting air ducts to the furnace. Optionally a cover 23 may be positioned between the furnace 97 and the air ducts.

The door 13 of the furnace is preferably mounted to the furnace by hinges 11 to allow access to the blower motor 36. Blower motor is mounted in a blower housing 48, 49 and attached to the furnace with mounting brackets 46. Air drawn in by the furnace fan may optionally be routed through a venturi 47 to increase the inlet pressure. A motor clamp 3 secures the furnace fan 1 to the blower motor 36 and a motor gasket is positioned adjacent the motor combustion wall 50. Preferably one end of the blower motor 36 is connected to the furnace fan 1 and the other end is connected to the combustion wheel 10 so that both the furnace fan 1 and the combustion wheel 10 rotate together. In accordance with a preferred embodiment, the blower motor is a 10 Volt, DC motor, and the motor receives a first voltage (for example 10.8V) from the motor controller 53 to run the furnace fan 1 at a high speed, and a second voltage (for example, 6 V) from the motor controller to run the furnace fan at a low speed. Known blower motors for two-stage furnaces used in the residential market are commonly designed to operate with 110 V AC power sources which provide a constant voltage to the motor. Applying this constant voltage to different portions of motor windings produces two fan speeds. Since recreational vehicles often use a 12 Volt DC power supply, the DC blower motor 36 capable of responding to two distinct voltages is particularly advantageous for air comfort control devices used in such applications. Given the known irregularities of power supplies, especially to power supplies for recreational vehicles, it is preferable that the voltage applied to the blower motor be conditioned by pulse width modulation to provide a better signal to the motor.

Several maintenance and safety features which are routinely employed in furnaces are disclosed. An On/Off switch 8 is used for shutting off power to the furnace or resetting the furnace after a diagnostic failure has been indicated, and also shutting off power to the gas valve 17. Circuit breaker 51 limits amperage draw of the motor 36. Sail switch 41 ensures air flow before ignition. Air circulated by the blower motor 36 closes contacts in the sail switch. Limit switch 32 is another safety device that protects the furnace from overheating. The contacts in the limit switch open at a given temperature setting, shutting off power. Additional advantageous maintenance and diagnostic features are discussed below with reference to the motor controller 53 and the ignition controller 20. Other diagnostic and safety features will be readily apparent to those skilled in the art given the benefit of this disclosure.

The thermostat 15 is in electrical communication with the furnace through case bulkhead connector 18. In accordance with a highly advantageous feature, the thermostat can be set to one of 13 different settings and can control a separate air conditioner and furnace such as is commonly found in recreational vehicles. FIG. 4 is a table showing the various thermostat settings which can be obtained using the switches and buttons on the thermostat. 5 different settings are available for furnace operation, 5 for air conditioner operation, 2 for fan operation, and an Off setting. In the thermostat furnace operation settings in FIG. 4, the thermostat 15 can be set to an automatic mode where the furnace 97 automatically heats the partially enclosed environment to the desired temperature using either the high BTU setting or the low BTU setting as determined by a preprogrammed algorithm which is a function of the variation of the actual temperature of the air from the desired temperature of the air. For example, if the actual temperature is more than two degrees Fahrenheit below the desired temperature, the thermostat controller in the automatic mode directs the furnace to run at the high BTU setting. Then, once the actual temperature is within two degrees Fahrenheit, the thermostat controller directs the furnace to run at the low BTU setting. Other preprogrammed algorithms for changing the air temperature of a partially enclosed environment to a desired temperature will be readily apparent to those skilled in the art given the benefit of this disclosure.

The table in FIG. 4 also shows that in the furnace operation the thermostat 15 can be set to one of 4 manual modes. In one mode, an operator can manually set the furnace to the high BTU setting where the gas valve 17 is set to the high position and the furnace fan 1 is set to the high speed position irrespective of the variation of the actual air temperature from the desired temperature or set point. Similarly, in the furnace operation manual mode the operator can manually set the furnace to the low BTU setting where the gas valve is set to the low position and the furnace fan is set to the low speed position. If desired, the thermostat may also be set to either a high furnace fan speed position where the air is not heated, or a low furnace fan speed position where the air is not heated. In both of the last two furnace operation modes of the thermostat, the air conditioner fan 78 (seen schematically in FIG. 7 and discussed below) does not run.

Figure 7:
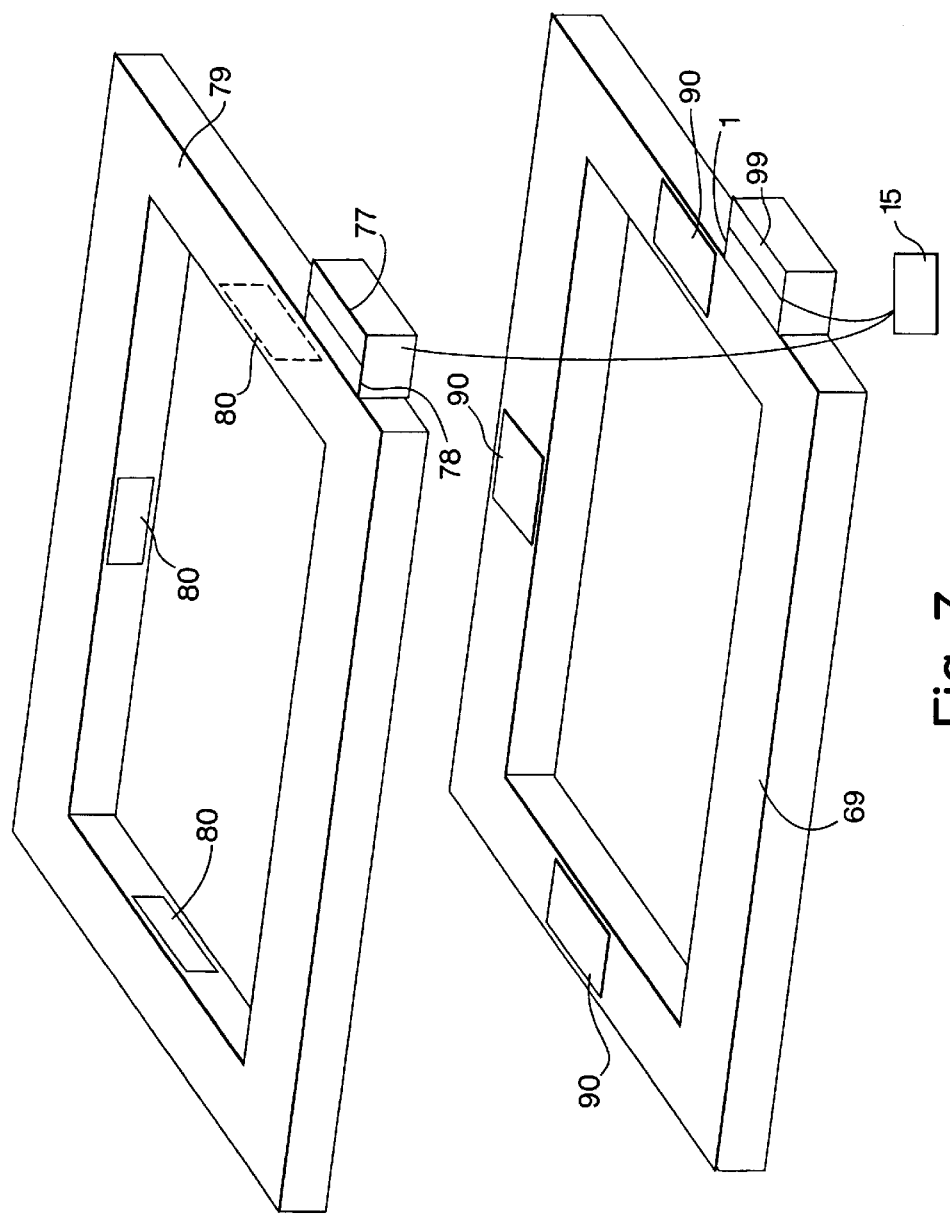
FIG. 7 is a schematic of a air duct plan of a preferred embodiment where there is a separate furnace fan and air conditioning fan controlled by one thermostat.

FIG. 7 shows a schematic of a highly advantageous feature, where the thermostat 15 controls the furnace 97 and the furnace fan 1, and also controls an air conditioner 77 and air conditioner fan 78 separate from the furnace fan. The FIG. 7 schematic is representative of a common situation found in recreational vehicles where the air conditioner fan 78 circulates cooling air to duct 79 to vents 80, and the furnace fan 1 circulates heating air to duct 69 to vents 90. In the air conditioner mode of operation, shown in FIG. 4, the air conditioner fan can be set to an automatic setting which, like the automatic furnace setting, automatically changes the temperature of the air in the partially enclosed environment to the desired temperature according to a predetermined algorithm. The air conditioner operation also has a manual mode where the air conditioner can run at a high compressor speed or a low compressor speed, or where the air conditioner fan runs at a high speed or a low speed and the compressor does not run, all in a manner similar to the manner in which the thermostat controls the furnace.

Advantageously, the thermostat 15 can control both the furnace fan 1 and the air conditioner fan 78 simultaneously. As shown in the fan operation of the thermostat 15, in a high fan mode both the air conditioner fan and the furnace fan run simultaneously on the high speed, and in a low fan mode both the air conditioner fan and the furnace fan run simultaneously on the low speed. The wide variety of thermostat settings increases the choices of an operator for climate control comfort.

Figure 5:
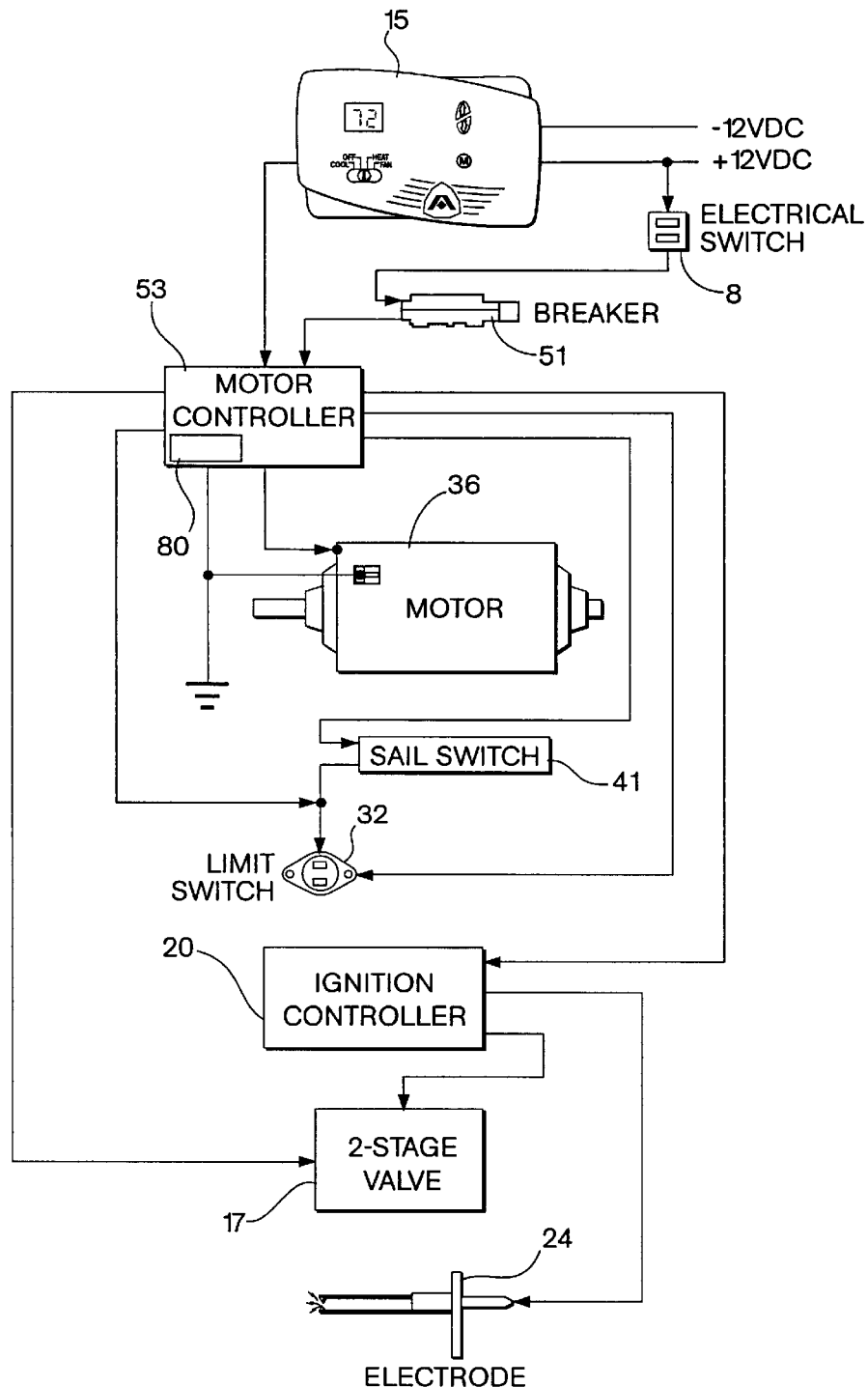
FIG. 5 is a schematic of the furnace shown in electrical communication with the thermostat.

Turning now to FIG. 5, the thermostat controller is shown to be in electrical communication with the motor controller 53 and the ignition controller 20. Input signals corresponding to operator settings and thermostat readings are sent to these controllers to control the two-stage valve 17, the blower motor 36, the spark-generating electrode 24 and the 2-stage valve 17. Various diagnostic and safety features include the sail switch 41 and limit switch 32 which provide feedback to the motor controller, the on/off electrical switch 8 and a circuit breaker positioned between the thermostat controller and the motor controller, and a motor control board mounted LED 80 which indicates various diagnostic information produced as a result of a diagnostic check. Preferably the diagnostic check is generated by the ignition controller 20 and a signal is sent to the LED on the motor control board 53. Important information about the activity and performance of the furnace 97 can be indicated by the diagnostic check and relayed to the LED. For example, the LED 80 can flash once when the input voltage is low, below the anticipated 12 Volts DC. The LED can flash twice if there is gas ignition failure. The LED can flash three times if the limit switch 32 is stuck open (indicating excessively high temperature). The LED can flash four times if the sail switch 41 is stuck (indicating insufficient air flow before ignition). The LED can flash five times if there is a module fault (indicating a malfunctioning controller). Preferably the last two indicators would also be associated with a hard lockout where the furnace would automatically shut itself down for service. That is, in a hard lockout the furnace 97 will not run again until an operator resets the furnace by resetting the thermostat, cutting power and then reinstating power. The first three indicators are preferably associated with a soft lockout which indicates that an internal timer has started and will attempt to verify that the furnace is operating properly at a later time, such as, for example, one hour. Of course, it will be readily apparent to those skilled in the art given the benefit of this disclosure that the number of LED flashes can correspond to any of the faults indicated by the diagnostic check, and that additional faults can be tested for and reported to the LED.

Figure 6:
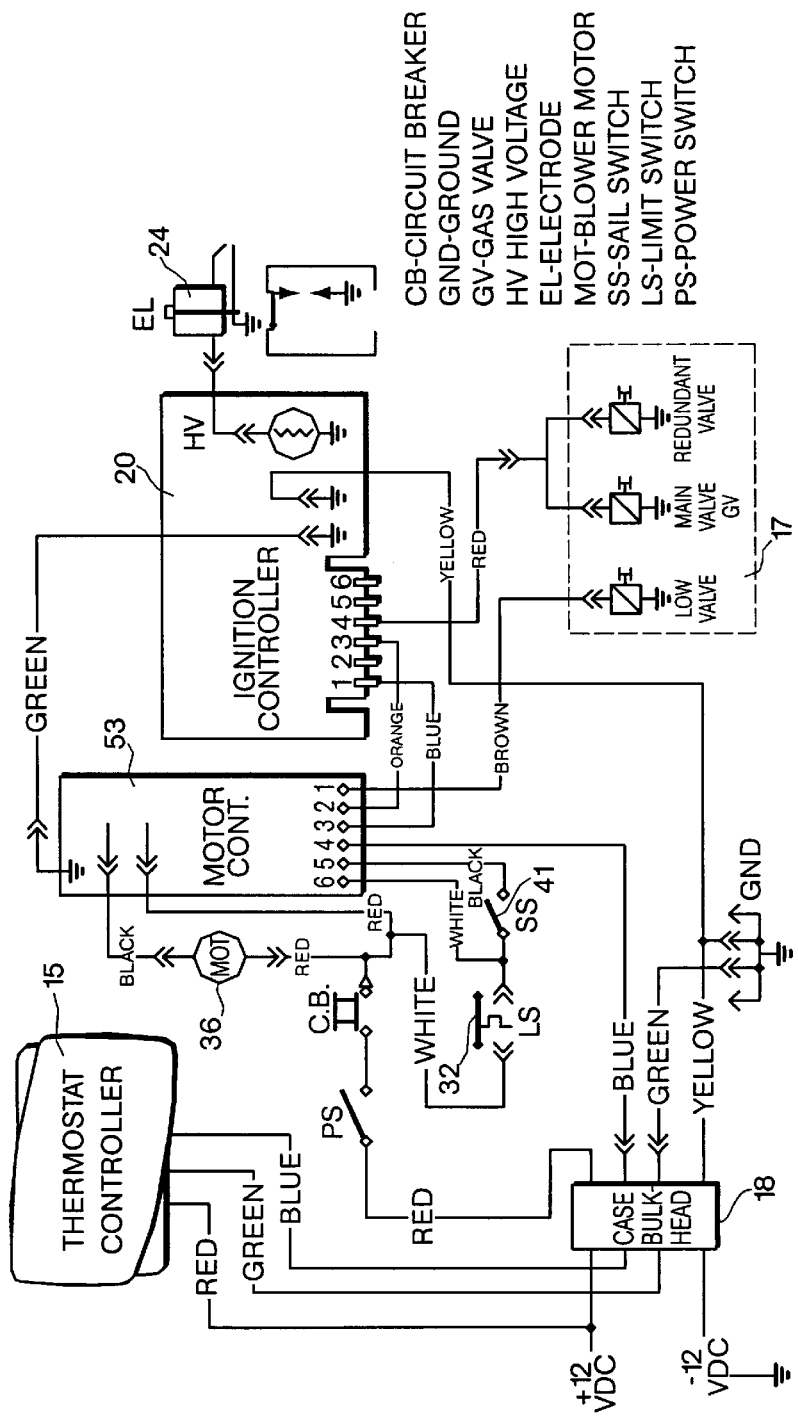
FIG. 6 is a diagram of the controller circuitry with appropriate wiring in accordance with a preferred embodiment.

FIG. 6 shows the control system circuit for the furnace connected to the thermostat. Wires are colored differently to indicate different connections for ease of assembly and accuracy. Preferably three controllers are used, a thermostat controller 15, a motor controller 53 (also known as a dual controller, as it also controls whether the low valve on gas valve 17), and an ignition controller 20. Each controller preferably comprises a microprocessor that performs separate and discrete tasks. The thermostat controller can receive as many as five different input signals; one corresponding to the actual temperature of the air in the partially enclosed environment; one corresponding to the desired temperature as indicated by the operator and set at the thermostat 15; one to indicate whether the furnace should run in the automatic mode or in the manual mode; one to indicate whether the furnace should run at the high BTU setting or the low BTU setting (when in the manual mode); and one to indicate whether the furnace fan should run at the high speed or the low speed (when in the manual mode). In response to this series of inputs the thermostat controller 15 generates a fan output signal which can control the demand to both the furnace fan and the air conditioner fan, a heat demand signal (hi BTU or low BTU) and a cooling demand signal (high cooling or low cooling).

The motor controller 53 output signals are directed to the furnace fan and the low or secondary valve on the gas valve 17. The ignition controller generates an output diagnostic signal and a primary valve output signal which controls whether the main valve and the redundant valve are open or closed. Preferably, none of the diagnostics are calculated or controlled on the motor controller, as these functions are handled by the ignition controller 20. This is advantageous in that service and testing of each controller can be conducted separately, and that if something is defective with either controller, replacement is less costly.

One example of how the control system circuit regulates the furnace is as follows. As power is applied to the circuit, timing circuits on the ignition controller allow the combustion wheel 10 to purge the burner box or heat chamber 5 of exhaust air for a short period of time, for example, 15 seconds. During the first seconds that current is applied the microprocessors confirm the input signals received and verify correct operation of the safety redundancies. The diagnostic check is performed, and in the event of failure the LED 80 on the motor controller 53 will flash corresponding to a predetermined code. The blower motor 36 receives current from the motor controller and will run at high speed or low speed depending on the demand output signal sent from the thermostat controller.

Current is supplied to the solenoid actuated two-stage gas valve 17 and causes it to open to the high setting. (The motor controller 53 would actuate the low setting by regulating the low valve of the valve 17). As the valve 17 opens, the ignition controller 20 sends a high voltage spark to the electrode 24. The ignition controller detects the presence of a flame. If a flame is not sensed within a brief period of time (for example, within 7 seconds after spark generation) a signal is sent to the motor controller 53 that there is no ignition and shuts off the gas valve. Then after another purge of exhaust air (this time can be longer than the first purge, for example, 25 seconds) the ignition process is repeated. After a third try, the ignition controller may go into the soft lockout discussed above and try again in an hour. After the timed hour, the diagnostic LED on the motor controller will flash an appropriate code. If there is still no ignition, this timing sequence will be repeated. If there is no ignition and the heat demand output signal is still being sent from the thermostat controller, the blower motor 36 will run for a limited period of time (such as, for example, 90 seconds) as a post purge and then shut off.

When the thermostat senses the desired temperature has been reached, a signal is sent to the motor controller to shut down operation of the gas valve and run the blower motor 36 for as much as 90 seconds as a post purge of heat.

Figure 8:
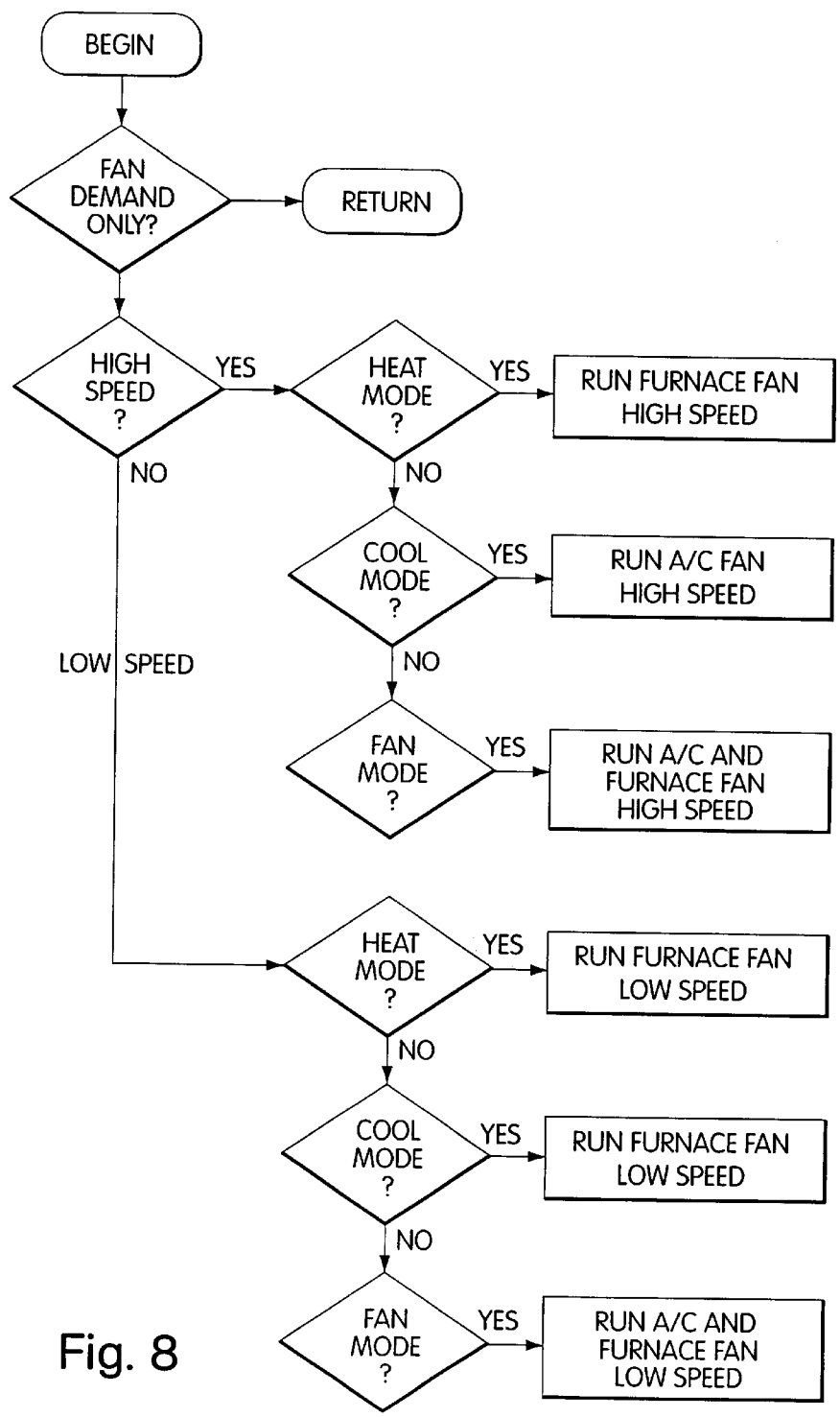
FIG. 8 shows a flow chart of a vent routine for a controller when it is desired to only use the fans.

FIG. 8 illustrates a preferred control logic diagram of the thermostat controller where only the furnace fan 1 or air conditioner fan 78 (or both) is desired by the operator. Upon receipt of a fan demand signal input, the controller determines whether high speed or low speed fan operation is preferred. If high speed, then the controller determines whether to run just the furnace fan 1 at high speed, just the air conditioner fan 78 at high speed, or run both the furnace fan and the air conditioner fan at high speed. If the low speed fan operation is preferred then the controller determines whether to run just the furnace fan 1 at low speed, just the air conditioner fan 78 at low speed, or run both the furnace fan and the air conditioner fan at low speed.

Figure 9:
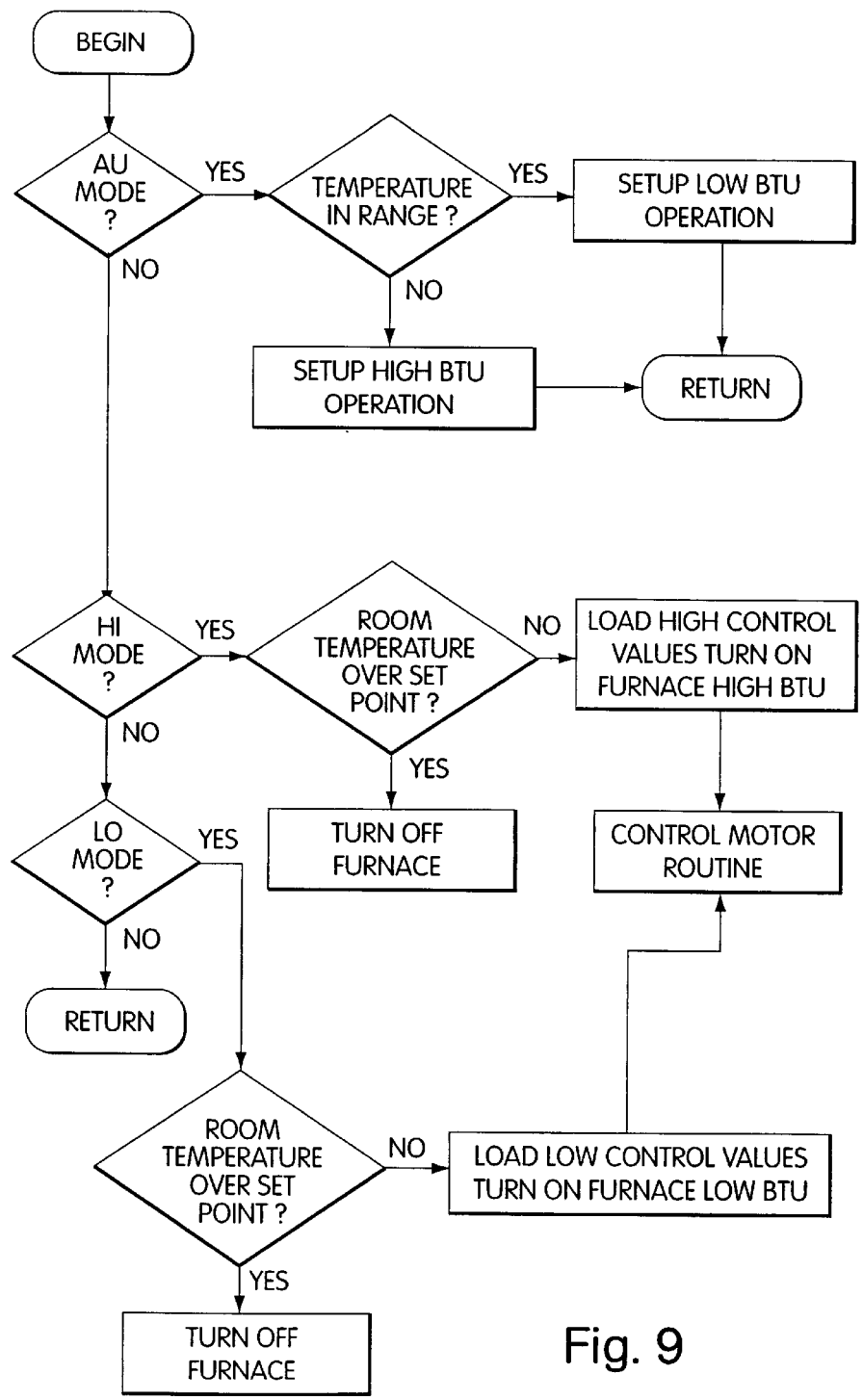
FIG. 9 shows a flow chart of a heat routine for controller to set the furnace to one of several settings.

FIG. 9 illustrates a preferred control logic diagram of the thermostat controller where heating is desired by the operator or required in response to an automatic setting. The thermostat controller receives the input signal indicating whether the mode is automatic or manual. If automatic mode is desired, then a predetermined algorithm is entered in which the choice of whether to run the furnace at the high BTU setting or the low BTU setting is a function of the difference between the actual temperature as measured by the thermostat and the desired temperature as set by the operator. If manual mode is desired, the thermostat controller then receives a heat input signal indicating the high BTU setting or the low BTU setting. In either case the thermostat controller compares the desired temperature set point with the actual temperature, and if the actual temperature exceeds the desired temperature, the furnace is shut off. If the actual temperature does not exceed the desired temperature set point, then the control values corresponding to the high BTU setting or the low BTU setting are set and sent to the motor controller. From there, a control motor routine has the output signal sent to the gas valve and the pulse width modulated output signal sent to the blower motor to actuate the motor at either the high speed or the low speed.

From the foregoing disclosure and detailed description of certain preferred embodiments, it will be apparent that various modifications, additions and other alternative embodiments are possible without departing from the true scope and spirit of the invention. For example, furnaces of this type can find ready application in recreational vehicles and motor homes. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. An air comfort control device comprising, in combination:
   a furnace fan;
   a blower motor for rotating the furnace fan at a high speed and a low speed;
   a temperature controller responsive to temperature changes in air in a partially enclosed environment and adapted to receive fan input signal;
   a motor controller which in response to a fan output signal from the temperature controller applies a first voltage to actuate the blower motor so that the furnace fan rotates at the high speed and a second voltage different from the first voltage to actuate the blower motor so that the furnace fan rotates at the low speed; and
   a mode input signal received by the temperature controller, which corresponds to one of an automatic mode of operation wherein the furnace is automatically actuated to change the temperature of the air to the desired temperature, and a manual mode of operation wherein the furnace is manually selected to change the temperature of the air to the desired temperature.

2. The air comfort control device of claim 1 wherein the first voltage is greater than 10 V DC and the second voltage is greater than 5 V DC.

3. The air comfort control device of claim 1 wherein the thermostat controller is positioned remote from the motor controller.

4. The air comfort control device of claim 1 wherein the first voltage is less then/12 VDC and the second voltage is less then 7 VDC.

5. An air comfort control device comprising, in combination:
   a furnace fan;
   a blower motor for rotating the furnace fan at a high speed and a low speed;
   a temperature controller responsive to temperature changes in air in a partially enclosed environment and adapted to receive fan input signal;
   a motor controller which in response to a fan output signal from the temperature controller applies a first voltage to actuate the blower motor so that the furnace fan rotates at the high speed and a second voltage different from the first voltage to actuate the blower motor so that the furnace fan rotates at the low speed, the motor controller sending a signal that controls the release of ignitable gas between two gas flow conditions; and
   a mode input signal received by the temperature controller, which corresponds to one of an automatic mode of operation wherein the furnace is automatically actuated to change the temperature of the air to the desired temperature, and a manual mode of operation wherein the furnace is manually selected to change the temperature of the air to the desired temperature.

6. The air comfort control device of claim 5 wherein upon receipt of a heat demand signal from the temperature controller, the motor controller sends a secondary valve signal to a valve to move the valve to one of a high position and a low position.

7. The air comfort control device of claim 5 wherein the first voltage is at least 10 VDC and the second voltage is at least 5VDC.

8. An air comfort control device comprising, in combination:
   a furnace fan;
   a blower motor for rotating the furnace fan at a high speed and a low speed;
   a temperature controller responsive to temperature changes in air in a partially enclosed environment and adapted to receive fan input signal; and
   a motor controller which in response to a fan output signal from the temperature controller applies a first voltage to actuate the blower motor so that the furnace fan rotates at the high speed and a second voltage different from the first voltage to actuate the blower motor so that the furnace fan rotates at the low speed, the motor controller sending a signal that controls the release of ignitable gas between two gas flow conditions, the voltage applied by the motor controller is conditioned by pulse width modulation.

9. An air comfort control device of comprising, in combination:
   a furnace fan and a blower motor for rotating the furnace fan at a high speed and a low speed;
   a gas valve having a closed position and an open position, and when in the open position is further in one of a high position and a low position;
   a temperature controller responsive to temperature changes in air in a partially enclosed environment:
   an ignition controller, which sends a signal to move the gas valve between the open and closed positions; and
   a motor controller separate from the ignition controller, which in response to a signal from the temperature controller sends a motor control signal to actuate the blower motor so that the furnace fan rotates at one of the high speed and low speed, and the motor controller sending a signal to control the movement of the gas valve to one of a high position and a low position;
   wherein a diagnostic check is performed by the ignition controller that sends a signal to a diagnostic LED mounted on the motor controller when the climate control device is not functioning properly.

10. The air comfort control device of claim 9 having a high BTU setting where the furnace fan rotates at high speed and the gas valve is in the high position, and a low BTU setting where the furnace fan rotates at low speed and the gas valve is in the low position.

11. An air comfort control device comprising, in combination:
   a furnace fan and a blower motor for rotating the furnace fan at a high speed and a low speed;
   a gas valve having a closed position and an open position, and when in the open position is further in one of a high position a low position;
   a temperature controller responsive to temperature changes in air in a partially enclosed environment;
   an ignition controller, which sends a signal to move the gas valve between the open and closed positions;
   a motor controller separate from the ignition controller, which in response to a signal from the temperature controller sends a motor control signal to actuate the blower motor so that the furnace fan rotates at one of the high speed and low speed, and the motor controller sending a signal to control move the gas valve to one of a high position and a low position; and
   an electrode, which in response to an ignition signal from the ignition controller generates a spark, which ignites gas released from the gas valve when the gas valve is in the open position, and the ignition controller sends a timing signal to the motor controller to control the sequence in which the blower is actuated and the gas valve is moved.

12. An air comfort control device comprising, in combination:
   a furnace having a fan;
   a blower motor connected to the furnace fan and adapted for rotating the blower motor at two speeds;
   a temperature controller operatively connected to the blower motor and responsive to changes in air temperature in a partially enclosed environment and sending a signal in response to the air temperature; and
   a motor controller operatively connected to the signal to apply a first voltage to actuate the blower motor so that the furnace fan operates at one of two speeds and second voltage different than the first voltage to actuate the blower motor so that the fan operates at another of two speeds, and generating a signal to control the release of ignitable gas between at least two conditions, the release of ignitable gas being regulated by a gas valve, at least one of the first and the second voltage applied by the motor controller is conditioned by pulse width modulation.

13. The air comfort control device of claim 12 wherein the one of two speeds is different from the another of two speeds.

14. The air comfort control device of claim 12 wherein the first voltage is at least 10 V DC and the second voltage is at least 5 V DC.

15. The air comfort control device of claim 12 wherein the furnace having a first BTU setting where the furnace fan rotates at one of two speeds and the gas valve is in a first condition.

16. The air comfort control device of claim 12 wherein the furnace having a second BTU setting where the furnace fan rotates at another of two speeds and the gas valve is in a second condition.

17. The air comfort control device of claim 12 further comprising an ignition controller.

18. An air comfort control device comprising, in combination:
   a furnace having a fan;
   a blower motor connected to the furnace fan and adapted for rotating the blower motor at two speeds;
   a temperature controller operatively connected to the blower motor and responsive to changes in air temperature in a partially enclosed environment and sending a signal in response to the air temperature; and
   a motor controller operatively connected to the signal to apply a first voltage to actuate the blower motor so that the furnace fan operates at one of two speeds and second voltage different than the first voltage to actuate the blower motor so that the fan operates at another of two speeds, and generating a signal to control the release of ignitable gas between at least two conditions, the first voltage is less than 12 V DC and the second voltage is less than 7 V DC.

19. The air comfort control device of claim 18 further comprising a mode input signal received by the temperature controller, the input signal responding to one of an automatic mode and manual mode to actuate the furnace to change the temperature of the air to the desired temperature.

20. The air comfort control device of claim 18 wherein the furnace having a valve and wherein upon receipt of the signal from the temperature controller, the motor controller sends a second signal to the valve to move the valve to one of the first position and a second position different from the first position.

* * * * *